United States Patent
Martínez de Castañeda et al.

(10) Patent No.: US 9,163,613 B2
(45) Date of Patent: Oct. 20, 2015

(54) SUPPORT STRUCTURE FOR A WIND TURBINE AND PROCEDURE TO ERECT THE SUPPORT STRUCTURE

(71) Applicants: Francisco Javier Martínez de Castañeda, Madrid (ES); Manuel Cidoncha Escobar, Madrid (ES)

(72) Inventors: Francisco Javier Martínez de Castañeda, Madrid (ES); Manuel Cidoncha Escobar, Madrid (ES)

(73) Assignee: PACADOR S.A. (ES)

( * ) Notice: Subject to any disclaimer, the term of this patent is extended or adjusted under 35 U.S.C. 154(b) by 0 days.

(21) Appl. No.: 14/329,871

(22) Filed: Jul. 11, 2014

(65) Prior Publication Data

US 2014/0318055 A1    Oct. 30, 2014

Related U.S. Application Data

(63) Continuation of application No. 13/321,169, filed as application No. PCT/IB2010/052222 on May 19, 2010, now abandoned.

(30) Foreign Application Priority Data

May 19, 2009    (EP) .................................... 09380102

(51) Int. Cl.
*E04C 5/08* (2006.01)
*F03D 11/04* (2006.01)
(Continued)

(52) U.S. Cl.
CPC ............ *F03D 11/045* (2013.01); *E04H 12/085* (2013.01); *E04H 12/12* (2013.01); *E04H 12/16* (2013.01); *F03D 1/001* (2013.01); *F03D 11/04* (2013.01); *Y02E 10/728* (2013.01)

(58) Field of Classification Search
CPC ....... F03D 11/045; F03D 11/04; E04C 5/122; E04C 3/34; E04C 2003/0413; E04C 5/08
USPC ........ 52/223.3–223.5, 223.7, 223.13, 223.14, 52/244, 296, 831, 834, 836, 843–845, 52/848; 403/331, 337, 338
See application file for complete search history.

(56) References Cited

U.S. PATENT DOCUMENTS 4,232,495 A * 11/1980 Lin et al. ...................... 52/223.3
5,809,711 A    9/1998 Werner
(Continued)

FOREIGN PATENT DOCUMENTS

DE    202005010398 U1    9/2005
EP    0758034 A1    2/1997
(Continued)

OTHER PUBLICATIONS

Translation of Petre et al. (FR 2,872,843) provided by espacenet.com.*

*Primary Examiner* — Brian D Mattei
(74) *Attorney, Agent, or Firm* — Hess Patent Law Firm LLC; Robert J. Hess

(57) ABSTRACT

A series of spans of column shaft (1) with a frustoconical shape, each span integrating two or more parts (2) and (3) with a polygonal or circular section formed with pieces prestressed in a bed in the factory, with centered or slightly deviated prestressing (4) and non-prestressed reinforcement (5) in the perimeter of the section or fibers, attached by means of wet or dry longitudinal joints (6), rotated in plan view or not, and transverse joints (7) which can be at different levels and provide continuity or not to the general prestressing, for a joining by means of steel bars (12), and in the case of the attachment to the foundation with direct positioning of the starter bars at the time said foundation is built, or by means of jacket tubes which will subsequently receive the mentioned bars (16).

15 Claims, 16 Drawing Sheets

(51) Int. Cl.
*E04H 12/08* (2006.01)
*E04H 12/16* (2006.01)
*F03D 1/00* (2006.01)
*E04H 12/12* (2006.01)

(56) References Cited

U.S. PATENT DOCUMENTS

| | | |
|---|---|---|
| 2003/0000165 A1 | 1/2003 | Tadros |
| 2006/0156681 A1 | 7/2006 | Fernandez Gomez |
| 2006/0225379 A1 | 10/2006 | Seidel |
| 2007/0294955 A1 | 12/2007 | Sportel |
| 2008/0209842 A1* | 9/2008 | Montaner Fraguet et al. ............... 52/651.07 |
| 2009/0000227 A1 | 1/2009 | Jakubowski |
| 2009/0025304 A1 | 1/2009 | Irniger et al. |

FOREIGN PATENT DOCUMENTS

| | | |
|---|---|---|
| FR | 1145789 A | 10/1957 |
| FR | 2628779 A1 | 9/1989 |
| FR | 2872843 A | 1/2006 |

\* cited by examiner

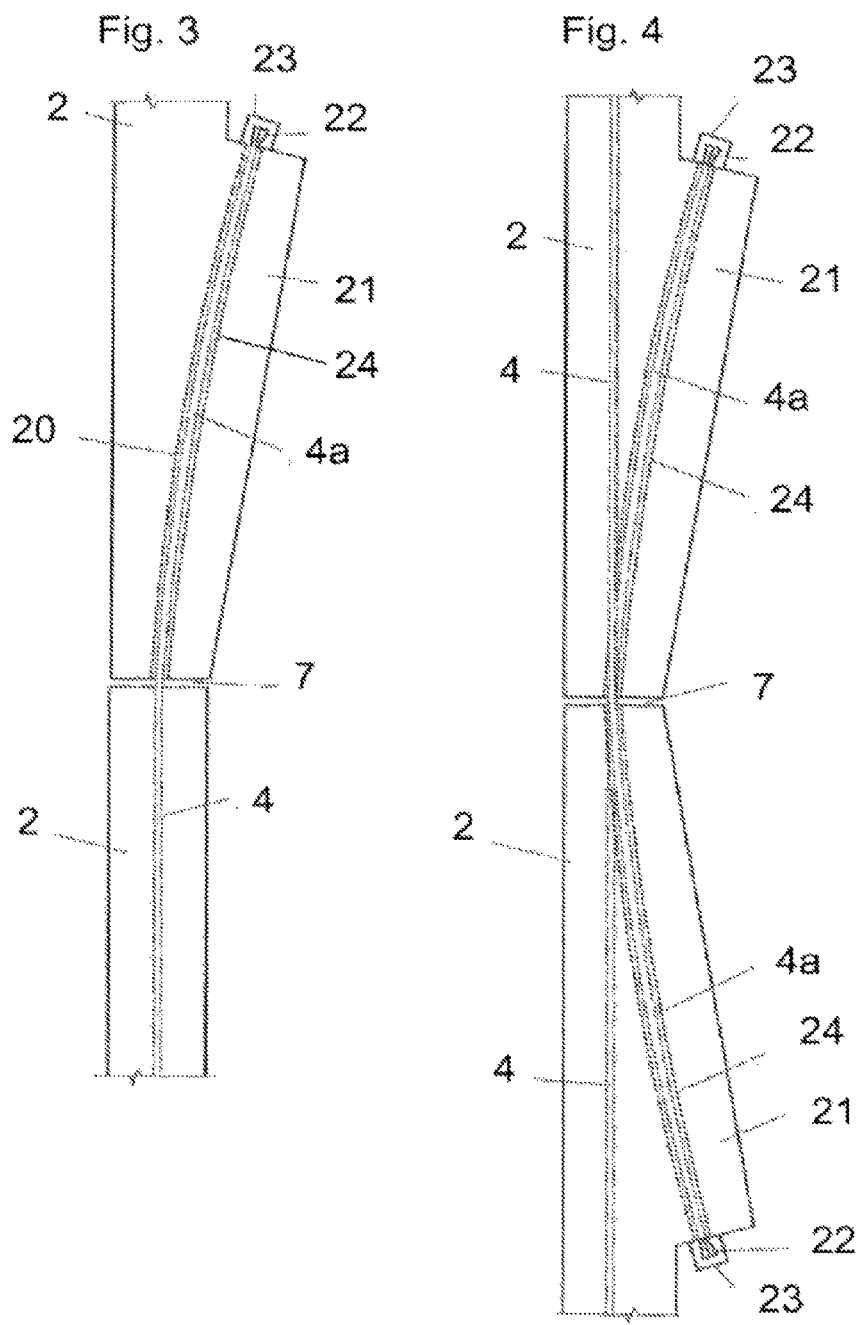

SUPPORT STRUCTURE FOR A WIND TURBINE AND PROCEDURE TO ERECT THE SUPPORT STRUCTURE

BACKGROUND OF THE INVENTION

1. Field of the Invention

The present invention relates to a vertical support structure or tower for wind turbines generating electric energy or other uses, made of prestressed concrete, providing a frustoconical or cylindrical column shaft of prestressed concrete with variable height built by means of annular sectors, each of which comprises several wall pieces with a semicircular or polygonal section or semicircular or polygonal sectors, longitudinally attached to each other, and in the case of several superimposed in height, longitudinally attached with a system allowing the structural continuity of the tower. Either the wind turbine directly or another metal column shaft on which the turbine will finally be fixed will be located at its upper end.

This invention also has its application in the field of construction in general and especially in the industry for building and installing support structures for wind turbines generating electric energy.

A second aspect of the invention relates to a process for erecting the support structure or tower based on the successive incorporation of the mentioned wall pieces Throughout the present specifically, wall piece will be understood as a piece forming the wall of the support structure or tower, being said wall thin, from 5 to 30 cm, made of prestressed concrete, with a centered prestressing and a non-prestressed reinforcement in the perimeter of the section or fiber-reinforced concrete, suitable for forming next to one or more pieces an annular sector of the support structure or tower.

2. Discussion of Related Art

In relation to the state of the art, it should be mentioned that the wind sector, which is widely expanding within the development of renewable energies, has gradually progressed in search of a greater cost-effectiveness, which has resulted in the design of increasingly more powerful wind turbines, of 3 or even 5 MW, to cover the demand created.

These new designs oblige rethinking the support structures or towers bearing the wind turbine, which must withstand stresses that are much greater than those today do and reach new heights of up to 120 m in order to be able to house machines with blades of more than 50 m in length.

An extrapolation of towers today (up to 70 m in height) built by means of curved and electrowelded plates, transversely attached by means of flanges, does not allow dealing with, in a cost-effective manner, the new features required of said elements, especially due to the enormous flexibility of this type of structures made of steel and to the incompatibility of this characteristic with the requirements extracted from the dynamic calculation of these new towers.

It is therefore necessary to use other materials and among them, concrete has the necessary characteristics for dealing with the aforementioned problems.

In this sense, there have been several initiatives that have already been undertaken: some solve the construction of these towers in reinforced concrete or performing a post-tensioning "in situ", i.e., in the wind farm itself and in its final position, of these elements as a result of a slipform or climbing form. In the case of post-tensioning "in situ", cables are passed through and post-tensioned inside the thin concrete wall in jacket tubes left for that purpose either on the inside or outside of the tower. In addition to being expensive, these solutions have the problem of the long periods required for performing them, which works directly against the cost-effectiveness of the project.

In other cases, attempts have been made to solve the problem by means of small pieces made of prefabricated concrete such as circular voussoirs, or small plates (which are attached to each other forming the tower). These generally reinforced pieces require considerable thicknesses in order to assure the suitable dynamic operation of the tower once it is subjected to the service loads and accordingly with a cracked section. For this reason, these designs are occasionally reinforced by means of inner or outer post-tensioning operations performed in situ which compress all the sections along the tower to prevent cracking.

In this solution, the presence of a large number of attachments between pieces, of post-tensioning operations in situ, etc., greatly complicates and makes the assembly of these towers extremely expensive and compromises the actual operation of the assembly.

A number of background documents are known which describe various embodiments towers using reinforced concrete, among which the following should be mentioned: JP-A-9-235912, DE-A-29809541, DE-A-19832921, EP-A-960986, US2006/0254168, WO 02/01025, U.S. Pat. No. 7,114,295, JP-OR-3074144, EP-A-1474579 (MECAL APPLIED MECHANICS), EP-A-1645761 (INNEO21), EP-A-1876316 (MONTANER), WO2007/033991 (SIKA), WO2008/031912 8 (GAMESA).

The technical solutions explained in the mentioned patents can be classified into the following groups:
a. Tower built in situ.
b. Tower made of reinforced concrete with superimposed annular sectors, and post-tensioning in the field.
c. Towers made of concrete formed by the superimposition of annular structural sectors integrated in two or more assembled component parts which require post-tensioning in the field.
d. Lattice towers either made of concrete or steel.
e. Tower formed by concrete poured between steel sheets.
f. Towers in which pieces with different shapes which are suitable for either aiding in the production or improving the structural efficacy are provided;
g. Towers including pieces having incorporated therein specific reinforcement elements.

Patent FR 1145789 relates to a process for building a tower or stack without scaffolding with prefabricated elements. Despite the fact that the document indicates that said prefabricated elements can be made of prestressed concrete, when FIGS. 8 to 10 are described it is indicated that the vertical attachments will include prestressed ties which can be seen in said figures.

U.S. Pat. No. 5,809,711 describes an apparatus and a method for attaching two precompressed concrete elements that can form structures such as masts, towers or for example bridges. The patent describes prestressed concrete elements, in the form of wall pieces, connected with several prestressed strands which are prolonged extended out of the wall piece and inserted through ducts configured in a superimposed adjacent wall piece, which ducts run through virtually all of said adjacent piece, for the linking thereto by a subsequent tensioning of said extension strands, obtaining universal joints. This constructive solution has the drawback of being limited to developments of little height of the wall pieces, such as voussoir structures, since otherwise the on site assembly of the wall pieces, which must have the strands inserted therein for the post-tensioning of the entire wall piece and the attachment between superimposed wall pieces, would involve a very difficult and complicated operation.

The present invention proposes a vertical support structure or tower, of the type comprising several superimposed annular structural sections, each of which integrates two or more wall pieces attached at their longitudinal edges, and it is different from the previous proposals, which are generally based on the post-tensioning of cables at the actual point of installation of the tower or wind farm, to provide the tower and the attachment joints with strength, by the particularity of building the wall pieces by prestressing in the factory, calculated according to the relative position that the piece will occupy in the tower or structure, therefore the pieces forming the tower, by incorporating the prestressing, are already by themselves structurally resistant, requiring only performing the attachments between the adjacent and superimposed wall pieces to form the tower. Furthermore, costs are reduced by means of the proposal of this invention since prestressing in the factory is an industrial process and since it is not necessary to place post-tensioned cables in the field. On the other hand, the technology applied eliminates the need for auxiliary elements for transport, assures a state of compression in the pieces which maximizes the useful life of the tower, allows new designs and assembly alternatives which simplify obtaining the tower.

Another distinguishing aspect of the proposal on which the present invention is based lies in a connection system between prefabricated elements with pre-tensioned reinforcement, particularly applicable to the attachment of the annular sectors of the column shaft, which allows the continuity of the prestressing action without (complete or partial) need of additional elements such as bond bars or other post-tensioning systems, and compressing the diffusion end areas of each piece in the attachments, using its own prestressing cables which configure the prestressed reinforcement of the pre-tensioned wall pieces mentioned, but which unlike the solution explained in U.S. Pat. No. 5,809,711, only affects a short end sector of each piece in the areas of attachment of the superimposed pieces.

Other documents of the state of the art which can be cited are patents DE 20 2005 020398, EP 1876316, EP 758034, DE 102 23 429, and JP 2004 011210.

The singular aspects of the present invention are described below.

BRIEF DESCRIPTION OF THE INVENTION

Compared to the previously mentioned solutions, the present invention solves the prefabrication of the tower by means of large wall pieces made of concrete prestressed in the manufacturing bed (controlled application of stress to the concrete by means of the tensioning of steel tendons or cables), with a length exclusively limited by the transport conditions (with lengths typically of 20 to 40 m), with a semicircular section or circular sector, or polygonal section or polygonal sector, each piece being designed to be able to work under the stresses derived from its own weight and from the transport as if it was a large U-shaped beam with a pre-determined structural strength. Furthermore, the prestressing of each of the pieces in the factory has been calculated for each wall piece according to the relative position that said wall piece is to occupy in the support structure or tower, i.e., to suitably respond to the structural load demands in each of the sections of the tower. These wall pieces thus allow forming the support structure or tower without the need of subjecting the assembly of each piece to additional, final post-tensioning operations in the field, affecting the entire piece.

As will be seen in the following explanation, post-tensioning operations will be performed only in some cases which exclusively affect a short development of each wall piece (typical lengths of 1 to 1.5 m), at the end part thereof, which allows compressing the facing and superimposed attachment diffusion end areas of the wall pieces.

The support structure or tower which is proposed integrates a generally frustoconical column shaft, although it can be cylindrical, partially formed by two or more superimposed annular structural sections or sectors, attached to each other by transverse joints. In accordance with the principles of this invention, each annular structural section of the tower integrates two or more prefabricated wall pieces prestressed in the factory, as mentioned, attached at their sides forming longitudinal joints of the tower.

The prestressing can be with post-tensioned reinforcements, in which the concreting is performed before the tensioning of the prestressed reinforcements, being housed in ducts or jacket tubes, performing their tensioning and anchoring when the concrete has acquired sufficient strength, or, as herein concerned, with 10 pre-tensioned reinforcements, in which the concreting is done after having provisionally tensioned and anchored the reinforcements in fixed elements.

In this case, when the concrete has acquired sufficient strength, the reinforcements are released from their provisional anchors and, by adhesion, the force previously introduced in the reinforcements is transferred to the concrete.

Finally, from the point of view of the adhesion conditions, the tendon can be adhesive, as is the case of the prestressing with pre-tensioned reinforcement, or with post-tensioned reinforcement in which after the stressing adhesive material is injected between the reinforcement and the concrete, or non-adhesive, as is the case of the prestressing with post-tensioned reinforcement in which systems for protecting the reinforcement are used which do not create adhesion.

The development of the tower and the systems of attachment by means of the use of the pieces prestressed directly in the factory provide the following advantages:

It involves a cost saving given that the prestressing acts as a resistant reinforcement in the piece from the start.

It allows obtaining larger pieces.

The use of the prestressing technique, high-strength concretes or fiber concretes involve a change in design, providing greater rigidity, slenderness, durability and savings in materials as occurs with the current technique for building bridges by means of prestressed double-T beams or box girders.

It prevents cracking and therefore assures greater rigidity of the tower, a longer useful life and lower maintenance costs.

It reduces production costs since the prestressing cables are placed in the factory in an industrial process.

It improves the assembly times and reduces the work to be performed in the field by simplifying their execution and costs. By reducing the assembly times, climatological uncertainties and difficulties inherent to the construction in the field are also reduced.

It eliminates the need for auxiliary elements for transport, allowing the placement of large pieces on conventional dolly trucks without the need for support structures.

Given the resistant capacity of the pieces, it allows new assembly alternatives such as that described in this patent in which once the pieces are partially attached at their lower part, they are resistant in an isolated manner.

The systems of attachment by means of dry joints allow building towers that can be disassembled. The complete disassembly of the tower does not require the demolition of any of its elements, making the reuse of the pieces forming the tower for its subsequent assembly in another area possible.

This allows the dismantling of the farms at the end of their useful life or even the reuse of the pieces to form towers with a greater height.

In accordance with the foregoing, one, two or more of the mentioned wall pieces placed in vertical position, and longitudinally attached, form a span of column shaft with the same appearance and functionality as those used today. Either a new prestressed concrete span again formed by two semicircular pieces, or a metal span, will be placed on this first cone frustum until reaching the necessary height.

Each piece will be made up of a semicircular or polygonal section or sector thereof, with lithe thickness and variable radius, made of high-strength concrete which could be, if required, self-compacting concrete, high-strength concrete, or fiber concrete with a centered prestressing, or slightly deviated to correct the effects of its own weight or other temporary loads, and a reinforcement which can be by means of the addition of fibers to the concrete or with non-prestressed reinforcement in the perimeter of the section, which will be performed in the horizontal position in a mold and beds prepared for such purpose.

This prestressing, performed in a bed by means of the positioning of jacket tubes and cables, concreting and subsequent tensioning thereof prior to the extraction of the piece from the mold, assures maintenance without cracking of the entire concrete section, preserving the mechanical and durability characteristics of the tower. This aspect is crucial since in other solutions of reinforced concrete, it becomes deformed under the demands and in order for the steel to begin to work, it needs to be stretched, causing cracks in concrete. In the piece that is prestressed from the manufacturing process itself, the non-occurrence of cracks is assured, increasing the useful life of the tower and eliminating the need for maintenance, which is very expensive in other solutions.

Instead of the wall piece being manufactured by prestressing, it could also be obtained by post-tensioning (independently of the complexity and costs of the operation) in the factory, due to the fact that what is important is that the stressing is incorporated in the wall piece from its manufacture, providing it with the mentioned structural strength independently of the system used.

The handling and transport of the wall pieces, until their final positioning, will be done in the place of manufacturing, possibly being necessary given the slenderness of the element, certain cross bracing elements.

The longitudinal attachments (according to the generatrix of the cone frustum) between the pieces will be done by means of a wet joint, with the overlap and passage of a non-prestressed reinforcement and a subsequent filling with a high-strength mortar, or by means of a dry joint, either by means of bushes and bolts inside the wall of the piece, diagonally crossing on a ground plan and at different heights, or with perforated concrete flanges, along the inside of the longitudinal edges of the piece, which would allow joining the joint by means of screw bolts and nuts, with control of the tightening torque.

In the case of several spans of the tower made of concrete being superimposed, the vertical joints could be rotated, on a ground plan, for the purpose of preventing a continuous joint along the different spans of the column shaft, or not rotating and leaving a continuous longitudinal joint, whichever is appropriate.

The transverse attachments between spans, or between the first span and the foundation, will be carried out by means of a widening at the ends of the perforated piece in the direction of the generatrix of the piece, which allows the joining by means of high-strength steel bars which can join the joint by means of a wet attachment anchored by overlap, a screwed attachment or an attachment post-tensioned in the field at the time of assembly, which will be protected with liquid or plastic cement mortars and/or resins, as well as any other protective product such as waxes.

In the case of the post-tensioned attachment, in addition to joining both pieces, these bond bars assure the continuity of the prestressing in all the sections of the tower. Therefore, depending on the anchoring system used (prestressing without auxiliary anchoring elements, prestressing anchored at the head by means of auxiliary supports, or post-tensioning), different lengths of thicknessing and of joining will be needed, being able to use, in the case of anchoring the prestressing from the end of the piece or in the case of post-tensioning, the thicknessing of the section of concrete at the ends of the piece can be replaced by a thick metal sheet in the form of an inner flange at said end, which allows, as a result of the relevant perforations, the attachment to the rest of the elements by means of high-strength bars which will be screwed with control of the tightening torque or they will be post-tensioned.

In the case of the attachment to the foundation, these rebars could have been placed at the time of building the footing or subsequently by means of the positioning of jacket tubes in the foundation in which the bars are introduced prior to their filling with high-strength mortar.

Both transverse and longitudinal attachments could be provided with a guide system, which enables the exact positioning of the pieces.

Given that, as mentioned, each span of the tower can be formed by two semicircular or polygonal pieces, but also by more pieces of section with a semicircular or polygonal sector, i.e., four pieces of half the section, six pieces of a third of the section, eight pieces of one fourth of the section, etc., it should be pointed out that said pieces at the start of the foundation of the tower can have a different length, for example half of them could have a normal length and the other half, in an intercalated manner, could have half of said length, whereby in the successive superimpositions of the following spans, the transverse attachments are at different levels, half the pieces at the end of the tower again being of half the length so that they are all leveled.

This assembly system prevents the use of auxiliary towers, reducing assembly times and costs.

The outer and inner finishing of the concrete of the pieces could be any of those existing for another type of piece, such as smooth, painted, textured, washed, etc.

The pieces could have the necessary gaps for the access of people and equipment to the inside of the tower.

As many inserts, anchor plates, etc., as needed for the installation of auxiliary equipment could also be positioned at the time of the manufacture both inside and outside the piece. In this sense, it should be mentioned that the assembly system may require the prior assembly of an auxiliary tower which, once the work is completed, can be disassembled or not, remaining inside the tower.

As previously mentioned, the invention also proposes a system for connecting prefabricated pre-tensioned elements based on its own prestressing cables, which offers the possibility for connection between prefabricated elements with pre-tensioned reinforcement without the need for additional elements based on the subsequent tensioning of part of the tensioning cables of the wall piece.

For such purpose, the prestressing cables used extend in said wall pieces, prestressed in the factory, through spans, projecting outside the wall piece, said extension spans being provided for being inserted through ducts configured in an adjacent wall piece, for linking thereto through a subsequent tensioning of said cable extension spans, as two superimposed wall pieces, with the ends facing, are arranged obtaining a transverse joint which assures the continuity of the prestressing.

Specifically, according to the system proposed by the present invention, the outwardly projecting part of the cables (which, in any case, is necessary for tensioning and which, however, in the conventional pre-tensioned solution must later be cut) is housed in ducts left for such purpose in the contiguous piece, which can all be located on the same side of the joint, or combined on either side.

In order to facilitate the passage of said cables, the system of the invention provides for the use of elements with longitudinal grooves and even common anchor plates with said typology.

This new system and process for retensioning allows giving continuity to the action of the prestressing, only a thicknessing of the cross-section of the piece with a length of between 50 and 300 cm for housing the anchor elements is needed.

In principle, the system is not adhesive in the area of the joint, given the need for a subsequent tensioning on one hand and of the rupture of the adhesion of the concrete at the end on the other hand.

It should be indicated, however, that the tensioning cable can simply be protected with grease or wax, or alternatively cement grout or resin to provide an adhesive system.

Elements for protecting the anchors such as caps or the like are also viable in the system proposed by the present invention.

On the other hand, given the reduced length of the area to be retensioned, the wedge draw-in must be small, precise calculations being required to determine the amount of tensioning to be performed, as well as the necessary dimensions of the anchor areas, being required.

The 0.5, 0.6, or 0.62 inch prestressing cable or others will be usual for conventional pre-tensioned reinforcements.

It should also be pointed out that the system is applicable in the attachment to foundations giving a sufficient margin to the anchor length in the foundation elements.

The proposed new system for connecting pre-tensioned prefabricated elements based on its own prestressing cables accordingly represents an innovative structure with structure and constitutive features unknown until now for such purpose, which reasons, combined with its practical utility, provide it with sufficient grounds to be granted the exclusive right which is sought.

Based on the foregoing, in addition to fully solving the technical needs generated in the wind sector for new generation wind turbines, this invention allows improving the cost expectations for the towers, offering additional advantages, such as little maintenance or the possibility of disassembling and moving the tower in the case of dry attachments, greater durability or greater fatigue strength.

On the other hand, its use is not restricted to the wind sector, effectively solving structures for stacks, control towers, communication towers, etc.

BRIEF DESCRIPTION OF THE DRAWINGS

To complement the description being made and for the purpose of aiding to better understand the features of the invention, several sheets of drawings are attached to the present specification as an integral part thereof, in which the following is depicted with an illustrative and non-limiting character:

FIG. 3 shows a section view according to a longitudinal section of a pre-tensioned prefabricated element in which there has been incorporated a system for connecting two superimposed wall pieces based on prestressing cables, according to the invention, in which an example of the attachment with the ducts located on the same side of the transverse joint can be seen.

FIG. 4 also shows a section view, according to a longitudinal section, of another example of a pre-tensioned prefabricated element incorporating the system for the attachment of the invention, in this case with the ducts located in a combined manner on either side of the transverse attachment.

DESCRIPTION OF SEVERAL EMBODIMENTS OF THE INVENTION

In view of the discussed figures and in accordance with the number used, an embodiment of the invention comprising the parts described below can be seen in said figures.

Figure 1:
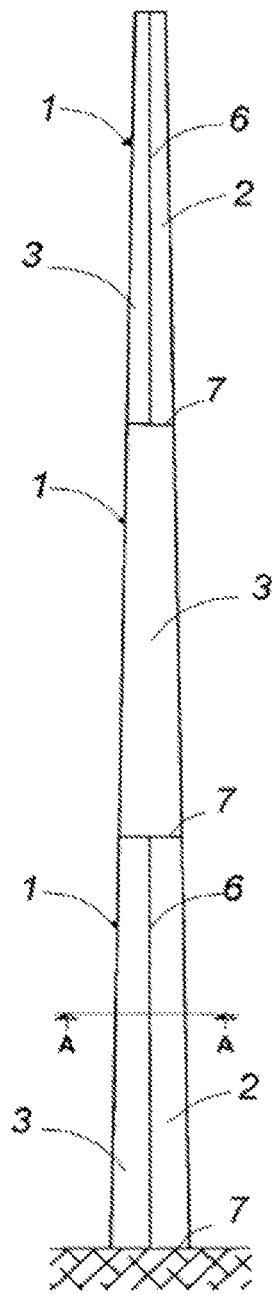
FIG. 1 shows an elevation view of the support structure for wind turbines generating electric energy and other uses made of prestressed concrete, entirely prefabricated, with a circular section, according to the invention in which its composition carried out by means of the attachment of several spans can be seen.
Figure 2:
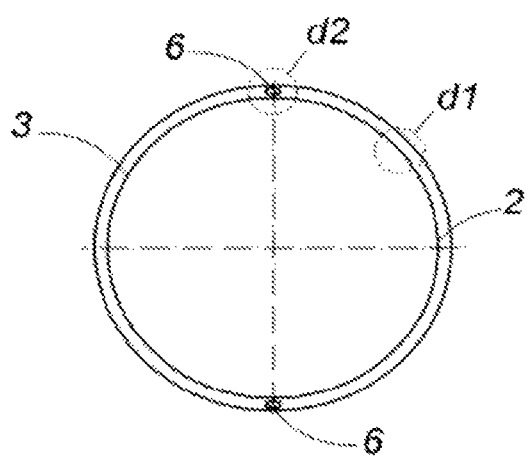
FIG. 2 shows a cross-section view of the support structure for wind turbines generating electric energy and other uses made of prestressed concrete, entirely prefabricated, with a circular section, according to section "A-A" indicated in FIG. 1.
Figure 6:
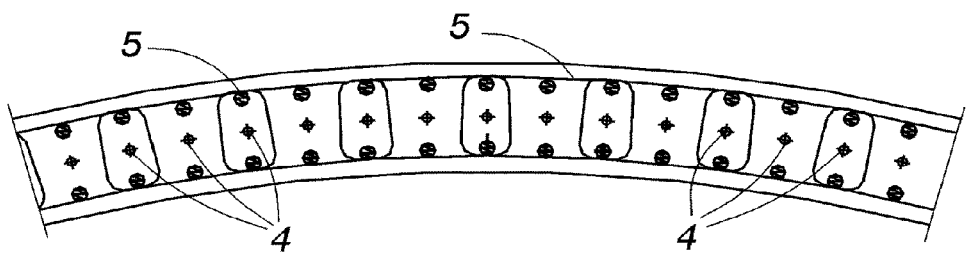
FIG. 6 shows an enlarged view of detail "d1" indicated in FIG. 2, in which the inner configuration of the structure of the invention is seen.

Thus, as depicted in FIGS. 1 and 2, the support structure for wind turbines generating electric energy and for other uses made of entirely prefabricated prestressed concrete is formed by a prefabricated column shaft -1- made of high-strength concrete which is prestressed or post-tensioned in the manufacturing bed which can self-compacting, if necessary, having a frustoconical shape with variable height made by means of at least two pieces -2- and -3- with semicircular or polygonal section (not illustrated), a thin wall of 5 to 30 cm having a centered prestressing -4- and a non-prestressed reinforcement in the perimeter of the section -5- as is observed in detail "d1" depicted in FIG. 6 and attached to each other by means of longitudinal joints -6-.

The prestressing -4- can have slight variations with respect to its centering in order to correct the effects of its own weight or other temporary loads.

In addition, the structure of the invention is formed by one or several spans of the mentioned prefabricated column shaft -1- made of concrete which is prestressed or post-tensioned in the manufacturing bed, attached to each other, where appropriate, by means of transverse joints -7- or by means of a connection system which will be detailed with specific reference to FIGS. 3 and 4 of the drawings.

Figure 7:
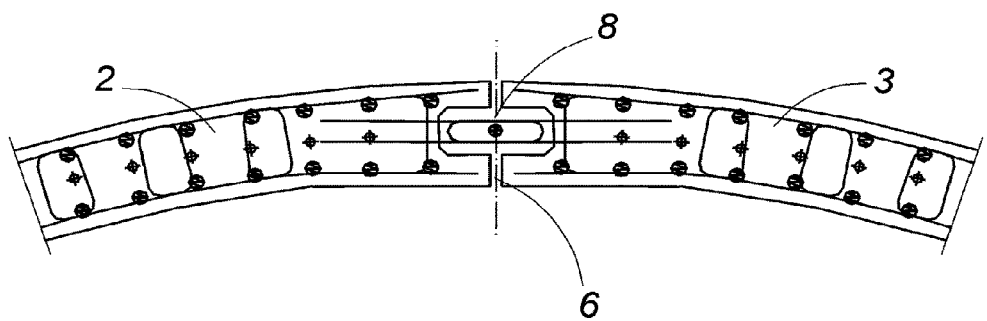
FIG. 7 shows an enlarged view of detail "d2" indicated in FIG. 2, in which the attachment of the pieces with semicircular or polygonal section forming it in the case of a wet joint is seen.
Figure 8:
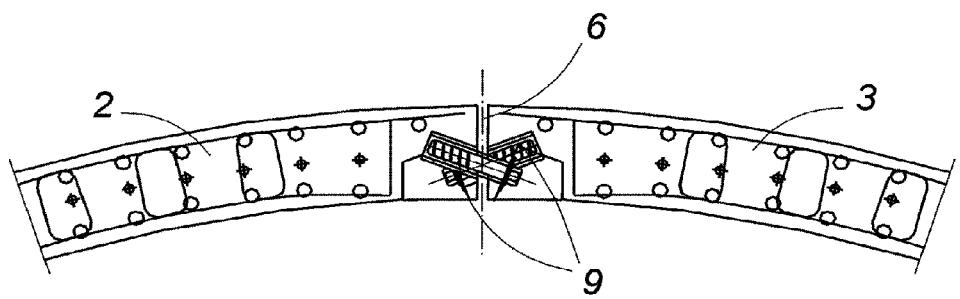
FIG. 8 shows an enlarged view of detail "d2" indicated in FIG. 2, in which the attachment of the pieces with semicircular or polygonal section forming it in the case of a joint with bolts and bushes is seen.
Figure 9:
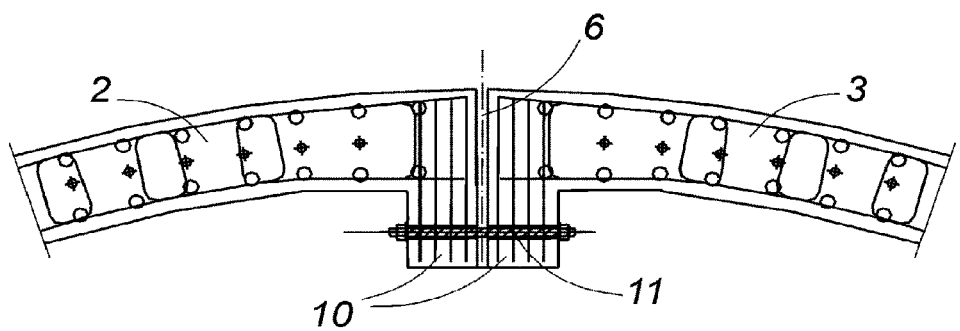
FIG. 9 shows an enlarged view of the detail "d2" indicated in FIG. 2, in which the attachment of the pieces with a semicircular or polygonal section forming it in the case of a joint with concrete flanges is seen.
Figure 10:
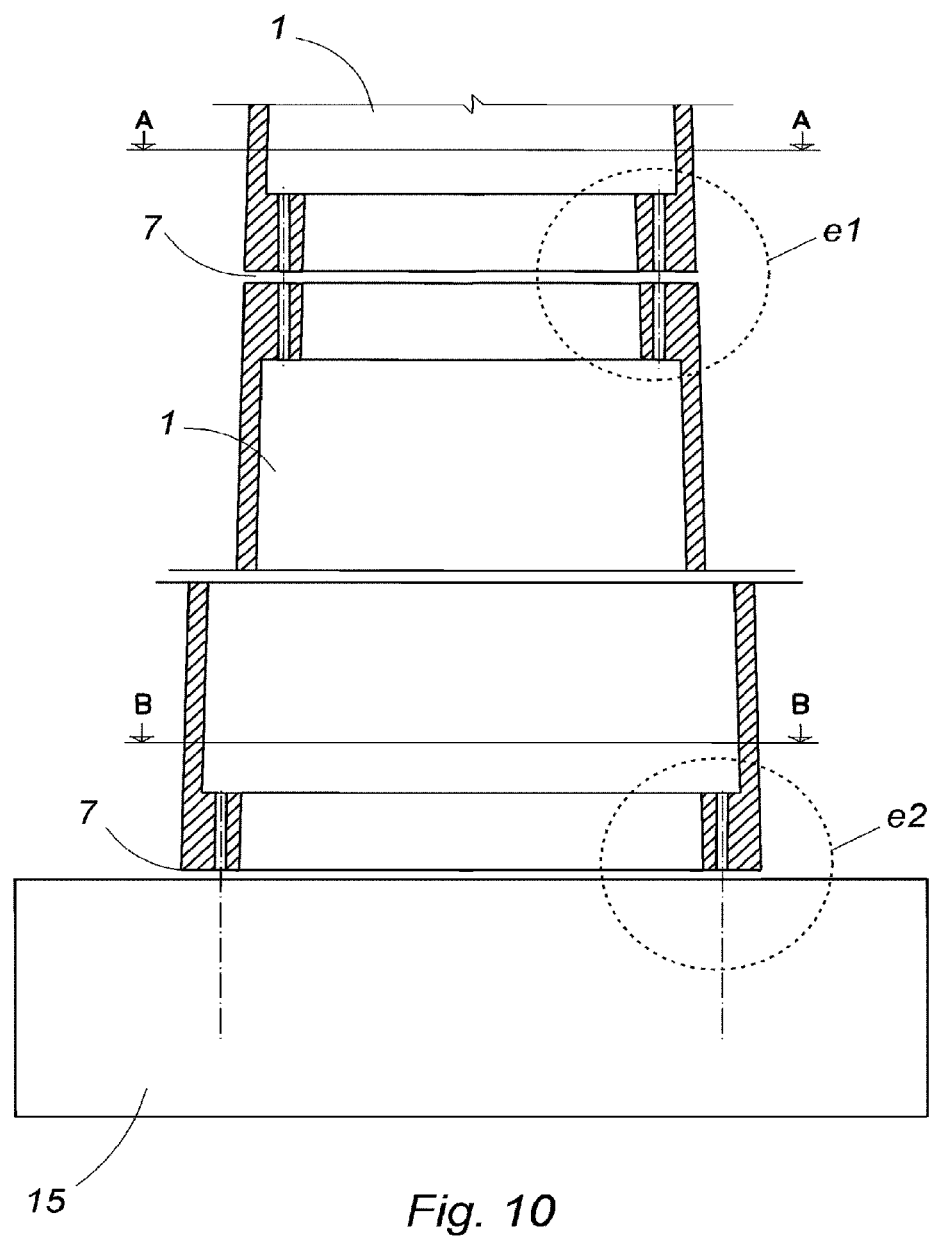
FIG. 10 shows a longitudinal section view of a portion of the structure of the invention and of its foundation.

The invention allows optionally performing three alternative versions according to a respective number of preferred embodiments in relation to the attachment of the mentioned longitudinal joints -6-. In a preferred embodiment, the invention provides the mentioned longitudinal attachments -6- carried out by means of wet joints -8-, with the overlap and passage of the non-prestressed reinforcement and subsequent filling with a high-strength mortar, as detailed in FIG. 7. In another embodiment, said longitudinal joint -6- is carried out by means of placing bushes and bolts -9- inside the wall of the piece diagonally crossing on a ground plan and at different heights, as detailed in FIG. 8. In a third preferred embodiment option, said longitudinal joint -6- is carried out with perforated concrete flanges -10-, along the inside of the longitudinal edges of the piece, which would allow joining the joint by means of screw bolts and nuts -11-, with control of the tightening torque, which is detailed in FIG. 9.

Figure 5:
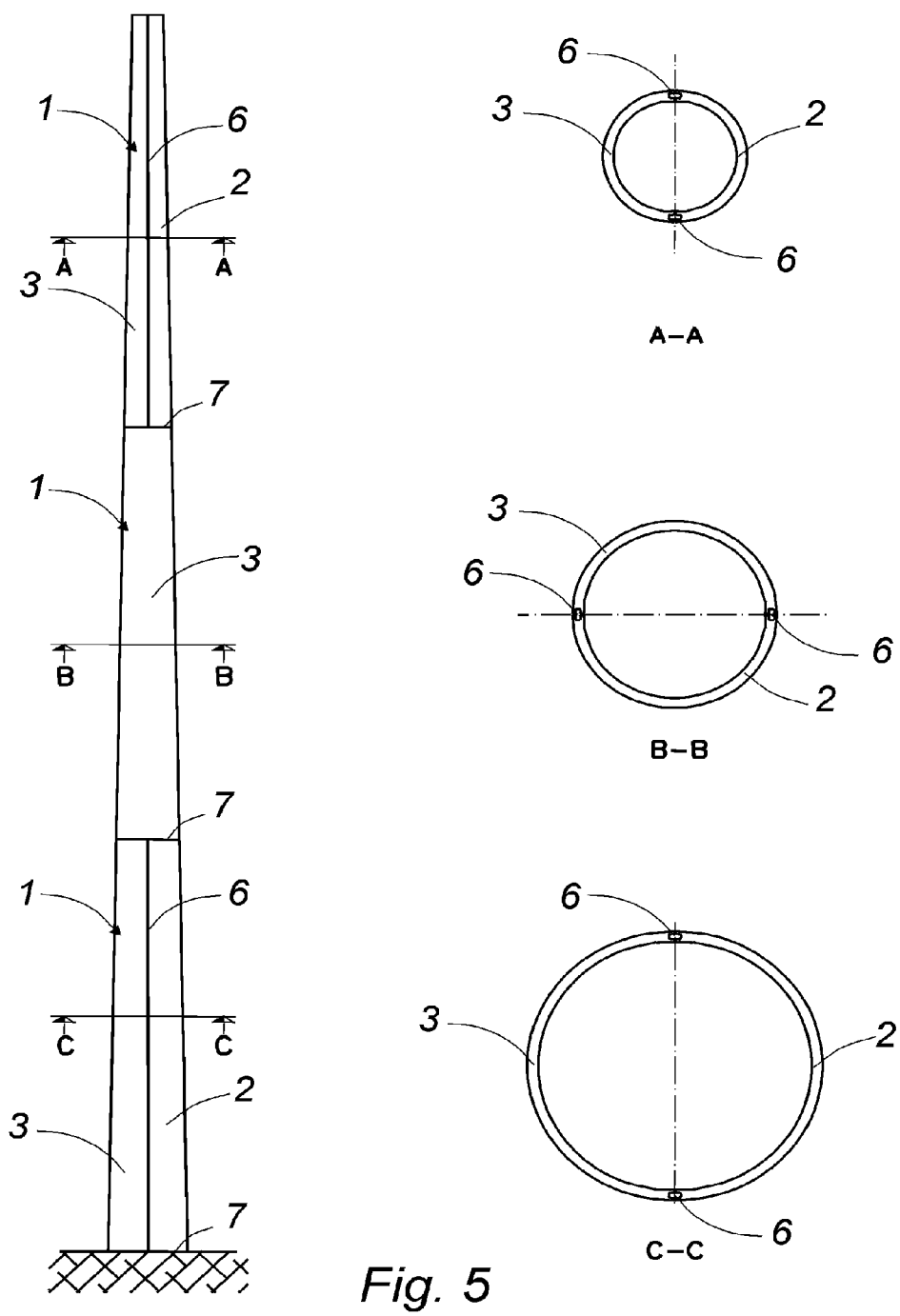
FIG. 5 shows an elevation view and several sections of the invention in which the arrangement of the pieces making up the assembly, in the case of the attachment of several spans, rotating the longitudinal joint of the column shaft in each span is seen.

It should be pointed out that the mentioned longitudinal joints -6- could be installed with a rotation in ground plan for the purpose of preventing a continuous joint along the different spans of the column shaft -1- which form the structure as observed in FIG. 5, but they could equally not be rotated and present continuity.

Figure 11:
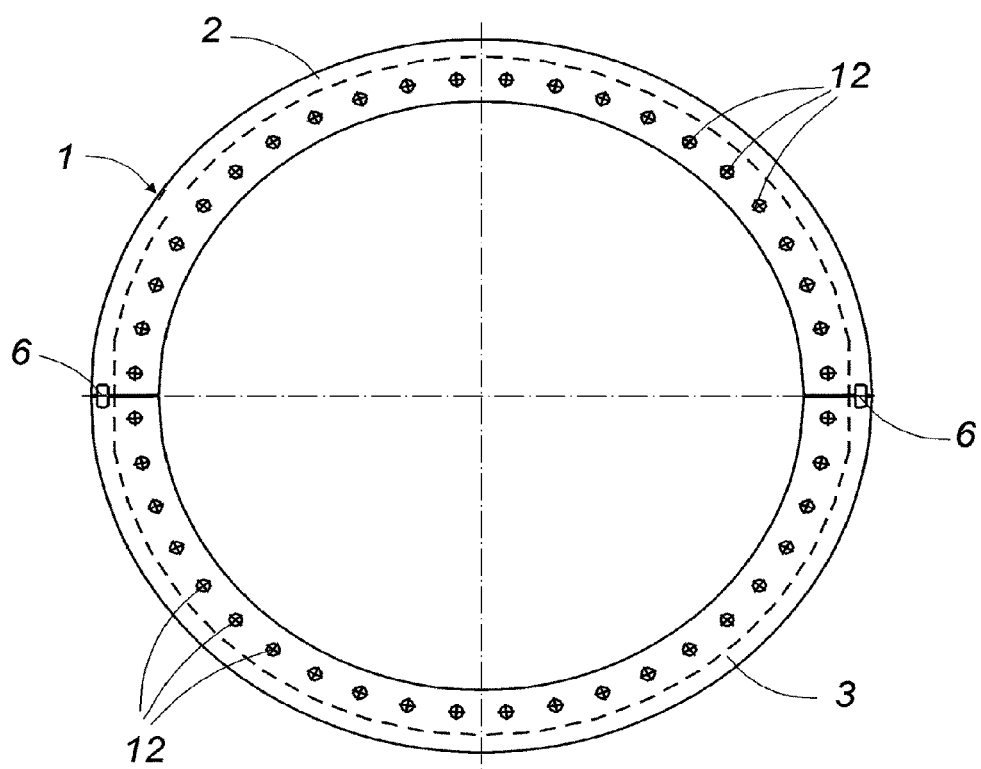
FIG. 11 shows a section view of the structure according to section "A-A" indicated in FIG. 10, in which a plan view of the transverse attachment between two spans of the invention can be seen.
Figure 14:
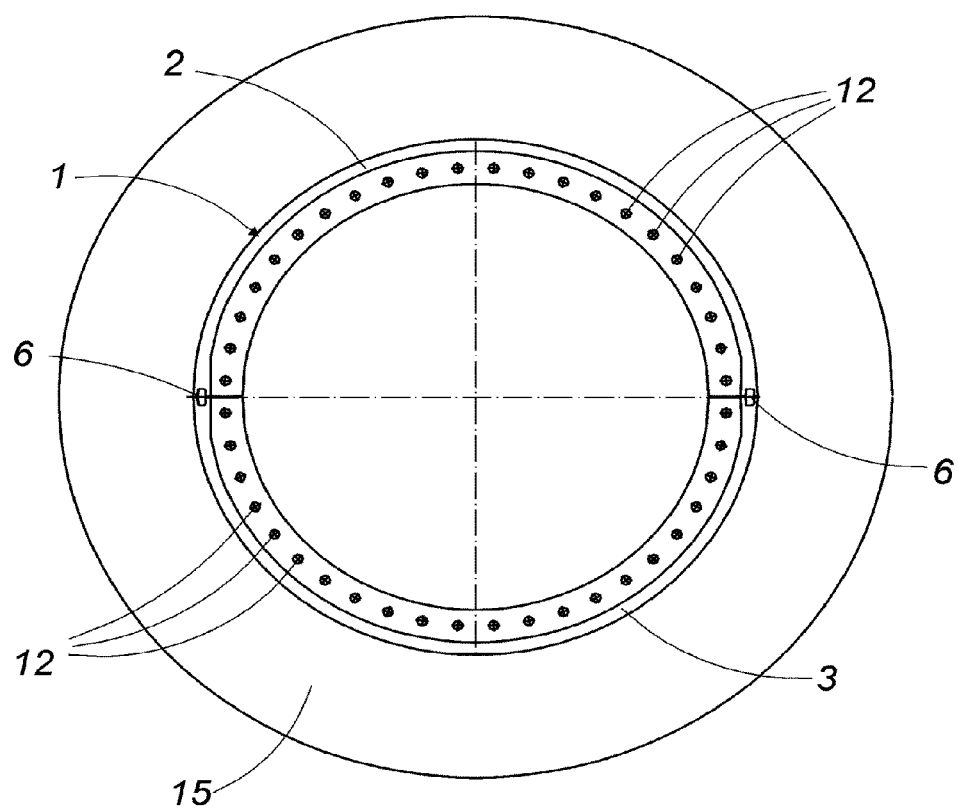
FIG. 14 shows a section view of the structure according to section "B-B" indicated in FIG. 10, in which a plan view of the attachment of the first span of the invention to the foundation can be seen.

In addition, the aforementioned transverse joints -7- to the foundation and between spans which are shown in FIGS. 11 and 14 will be joined by means of high-strength steel bars -12- which will be post-tensioned in the field at the time of the assembly and having sufficient length, thus assuring the continuity of the prestressing in all the sections of the tower, which will be protected with liquid or plastic cement mortars and/or resins, as well as any other protective product such as waxes. The system of FIGS. 3 and 4 explained below can also be used for the transverse joints.

Figure 12:
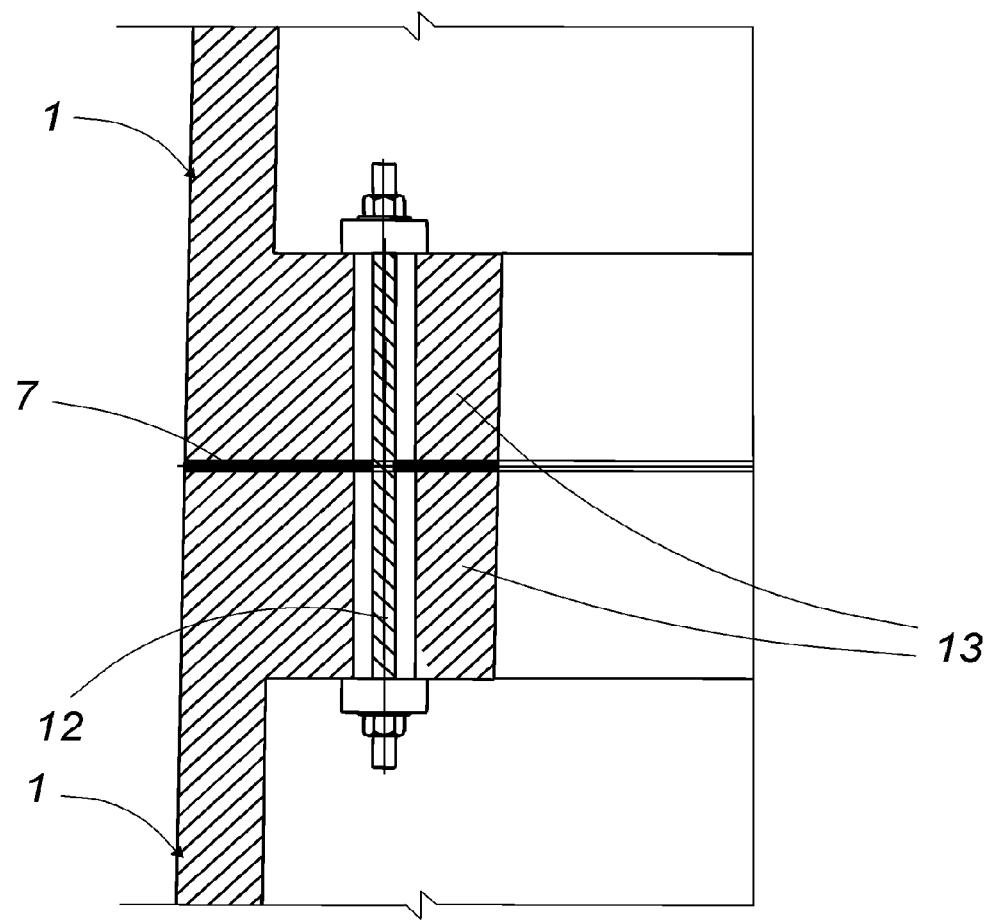
FIG. 12 shows an enlarged view of detail "e1" indicated in FIG. 10, in which is seen the embodiment of the transverse joints by means of thicknessings of the walls of the piece joined with high-strength steel bars assuring the continuity of the prestressing in all the sections of the tower.
Figure 13:
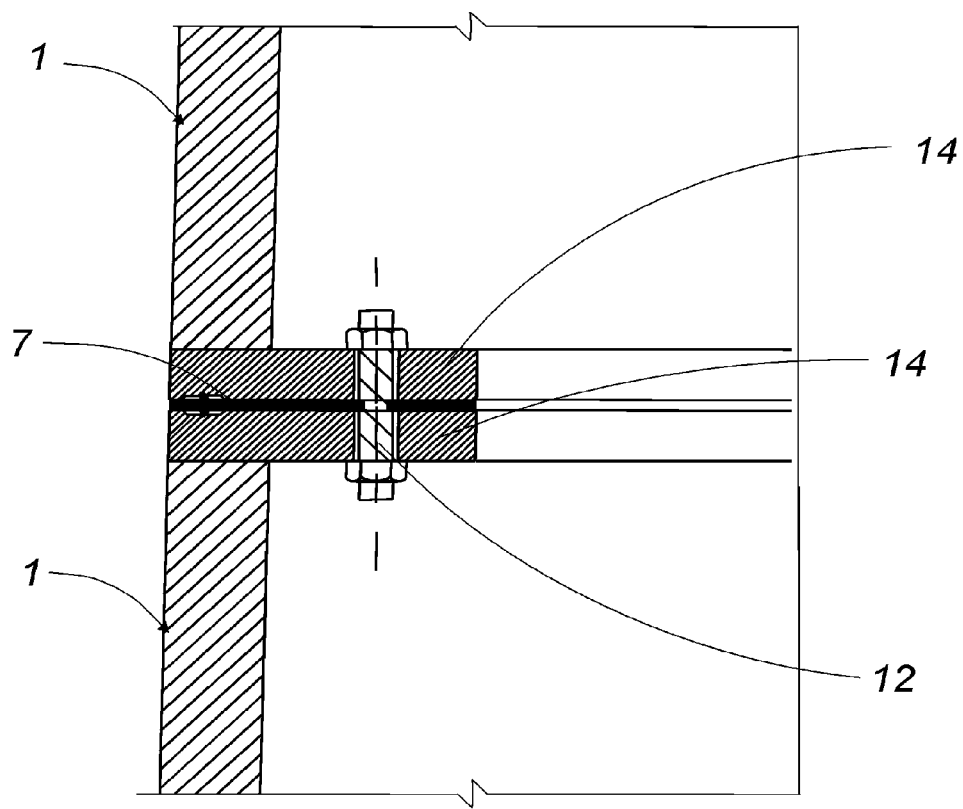
FIG. 13 shows an enlarged view of the detail "e1" indicated in FIG. 10, in which the embodiment of the transverse joints by means of metal flanges joined with high-strength steel bars screwed with control of the tightening torque, in the case of anchoring the prestressing from the end of the piece, is seen.

In a preferred embodiment of the invention, said steel bars -12- will be located in the transverse joints, traversing perforated thicknessings of the concrete wall -13- made at the ends of each span, as detailed in FIG. 12. In another preferred embodiment depicted in FIG. 13, for the case of anchoring the prestressing from the end of the piece, these bars traverse a very thick perforated metal sheet -14-, forming a flange inside the column shaft.

Figure 15:
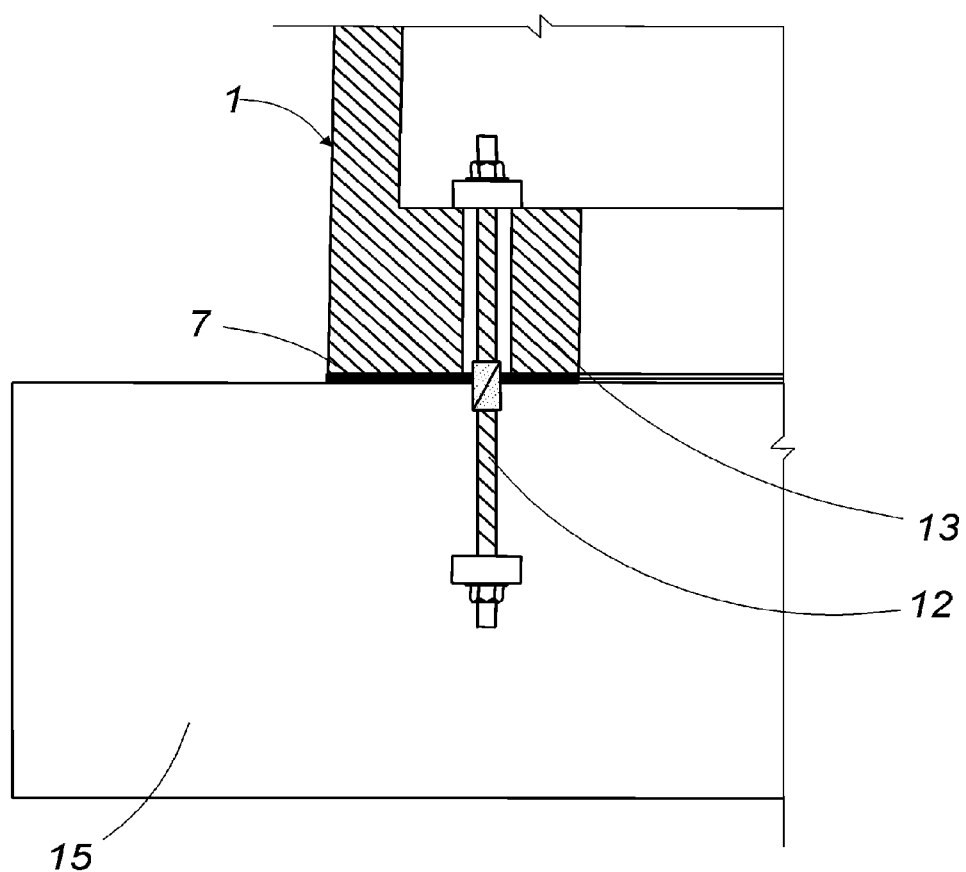
FIG. 15 shows an enlarged view of detail "e2" indicated in FIG. 10, in which the embodiment of the attachments to the foundation by means of the option of thicknessing of the walls of the piece attached to the foundation with high-strength steel bars but on site as rebars in the moment of making the foundation itself is seen.
Figure 16:
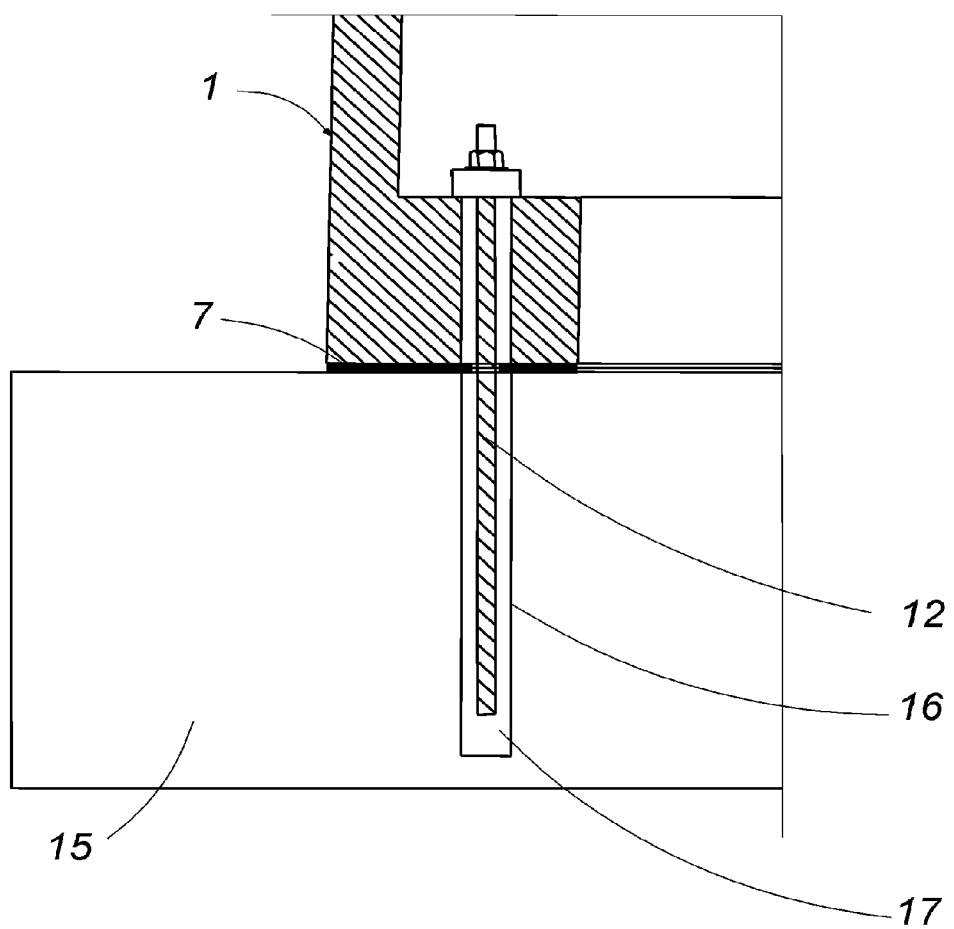
FIG. 16 shows an enlarged view of the detail "e2" indicated in FIG. 10, in which is seen the embodiment of the attachments to the foundation by means of the option of thicknessing of the walls of the piece, attached to the foundation with high-strength steel bars but on site as rebars in the foundation by means of jacket tubes.

In addition and in relation to the attachment of the column shaft to the foundation in a preferred embodiment of the invention, the fixing of said steel bars -12- in said foundation -15- can be carried out directly at the same time as the latter, as shown in FIG. 15, being able to alternatively, in another preferred embodiment depicted in FIG. 16, be carried out by means of the positioning of jacket tubes -16- in the foundation -15- in which the steel bars -12- are introduced prior to their filling with high-strength mortar -17-.

Figure 17:
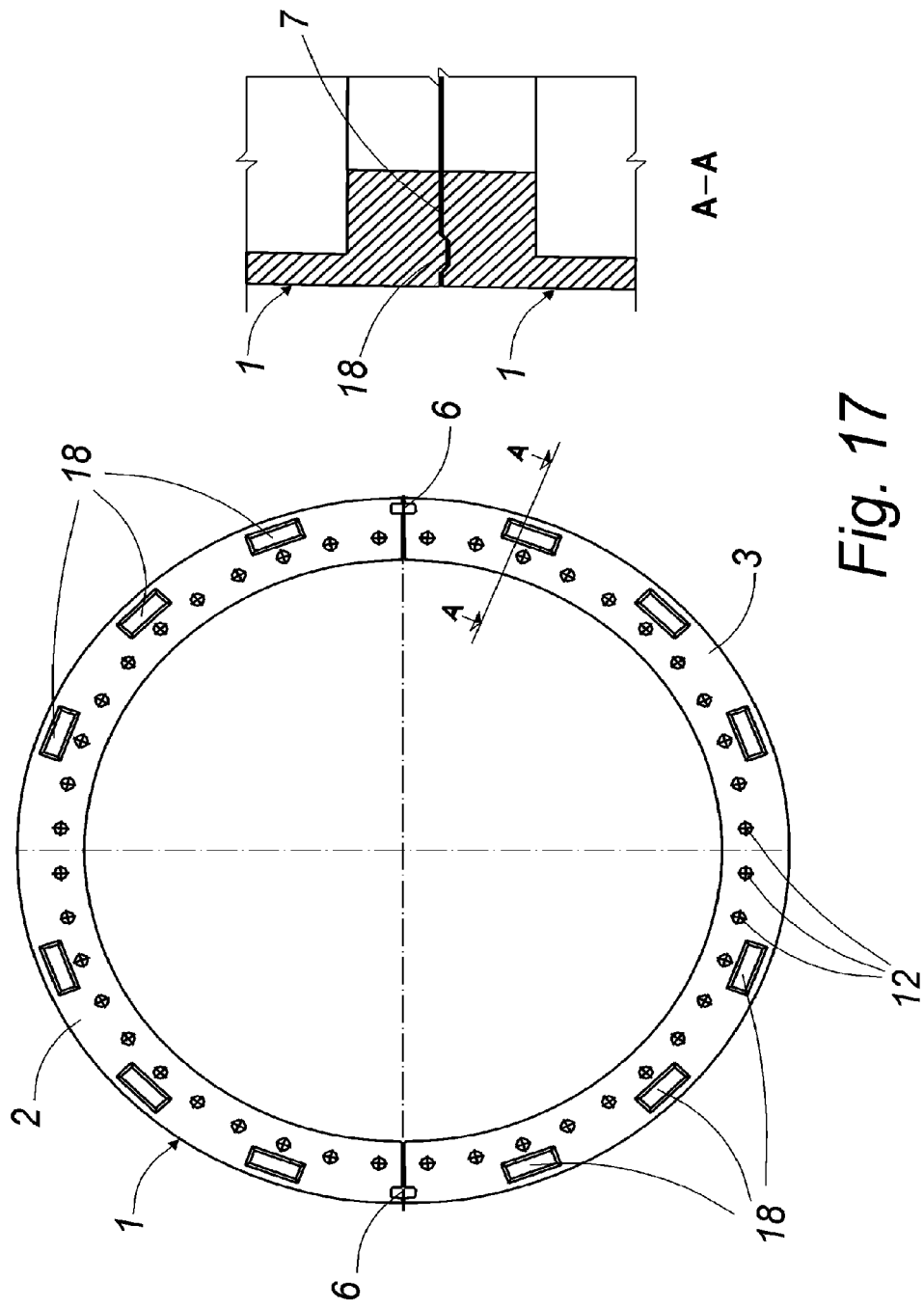
FIG. 17 shows a plan view of an attachment between spans of the invention with a detail of the positioning guides, as well as a section of an attachment between spans with the mentioned guides.

In order to enable the exact positioning, at the time of the assembly, of pieces -2- and -3- and the different spans of the column shaft -1- that they form, both the longitudinal joints -6- and the transverse joints -7- could optionally be provided with a conventional guide system -18- as detailed in FIG. 17.

Figure 18:
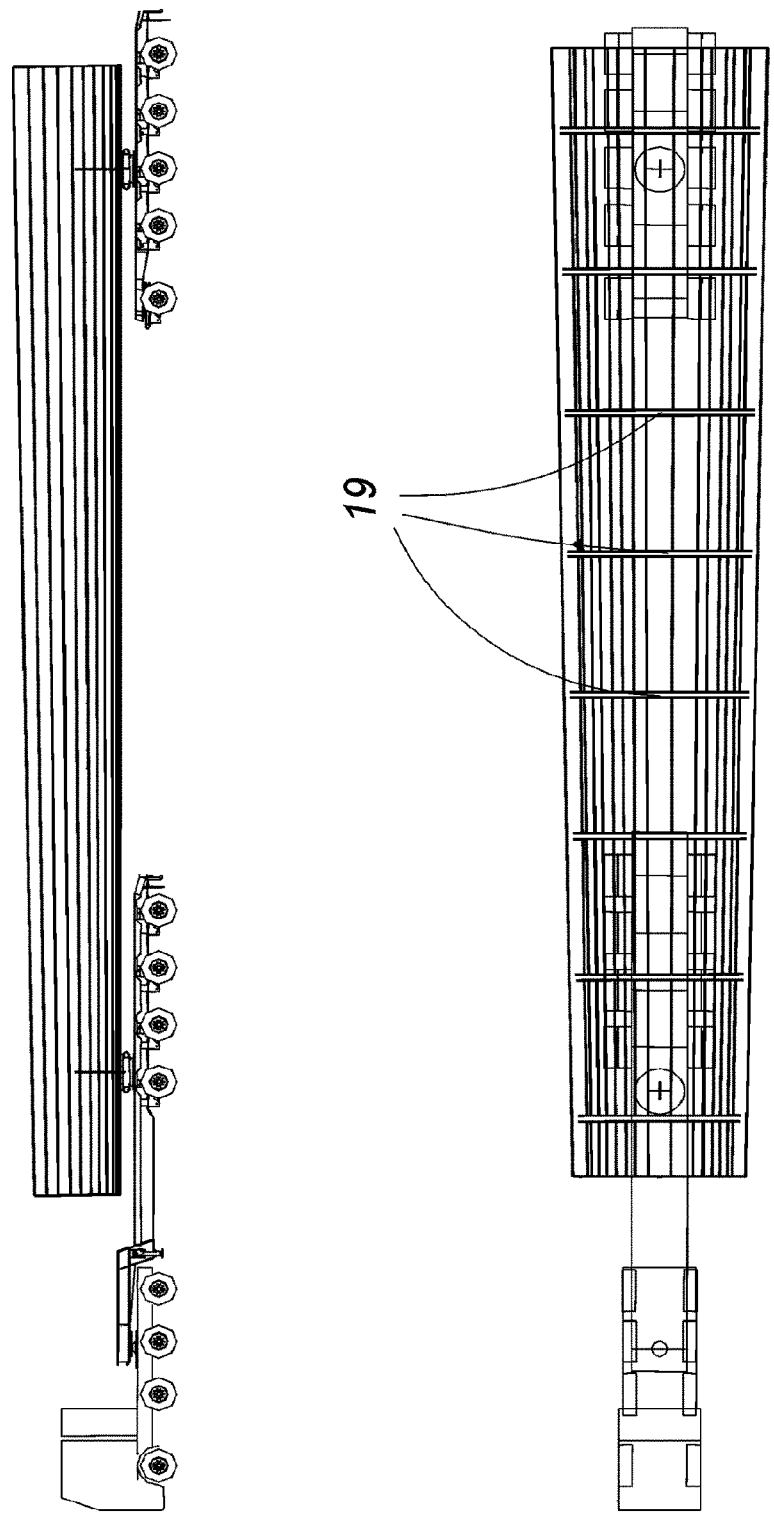
FIG. 18 shows a detail of the embodiment of the transport as well as the transverse bracing elements of the section.

Finally and to assure the stability of the piece prior to its definitive positioning, the pieces will optionally be provided with a transverse bracing system -19- as depicted in FIG. 18.

Figures 19, 20, 21:
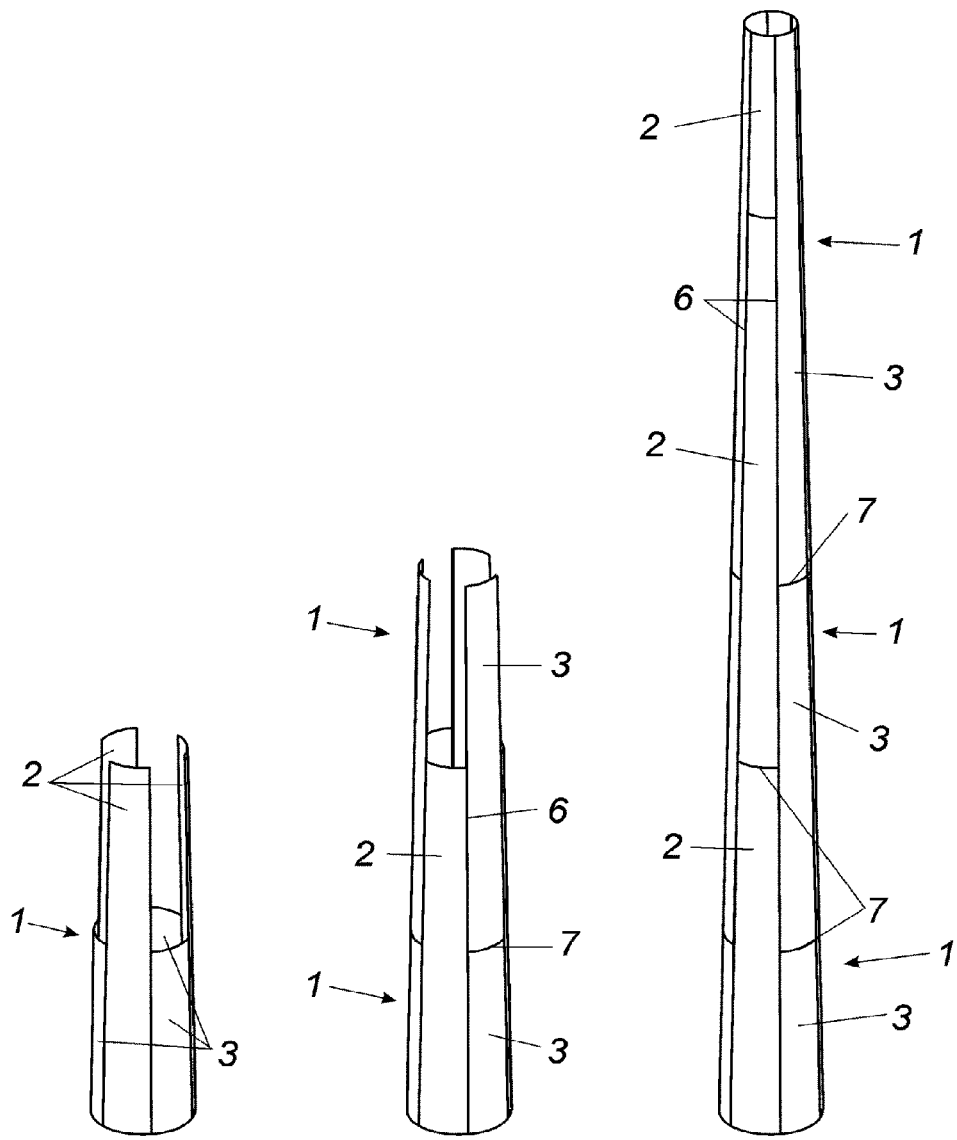
FIG. 19 shows a perspective view of the alternative assembly system of the structure of the invention by means of intercalated starting spans of different measurements.
FIGS. 20 and 21 show respective perspective views of successive assembly phases, up to the end of the structure, from the unequal spans shown in FIG. 19.

As is observed in FIGS. 19 to 21, according to an alternative embodiment, each span or column shaft -1- of the tower can be formed by more than two pieces -2- and -3- of section with a semicircular or polygonal sector (six pieces of a third of the section in the example depicted), half of which, at the start of the foundation of the tower and in an intercalated manner have a normal length -2- and the others -3- approximately half, such that in the successive superimpositions of the following spans -1-, the longitudinal attachments -6- are not rotated and the transverse attachments -7- are at different levels, half the pieces at the end of the tower again being of half the length so that they are all leveled at the top.

With reference FIGS. 3 and 4, the proposed connection system between pre-tensioned prefabricated elements is carried out in this embodiment using prefabricated wall pieces -2-, such as those described up to this point, internally provided with pre-tensioned tendons or cables with a portion of the cable -4a- projecting outwardly and housed in ducts -24- provided for such purpose in the contiguous wall piece -2- to which it must be attached. In order to obtain said attachment in said contiguous piece -2- a thickening -21- of its cross-section has been made which is suitable for housing the anchoring elements -22- on which protective elements -23- such as caps or the like can be incorporated. The mentioned ducts -24- can all be located on the same side of the joint, as observed in the embodiment depicted in FIG. 3, or they can be combined on either side, as depicted in the embodiment of FIG. 4.

In order to facilitate the passage of the cables -4- inside the ducts -4a-, the system of the invention provides for the use of elements with longitudinal grooves and even common anchor plates with said typology (not depicted).

It should be pointed out that the system is not adhesive in the area of the thickening 21- in which the ducts -4a- are located given the need for a subsequent tensioning on one hand and of the rupture of the adhesion of the concrete at the end on the other hand. However, the tensioning cable can simply be protected with grease or wax, or alternatively the connection system with cement grout or resin can subsequently be injected in order to provide an adhesive system.

Figure 22:
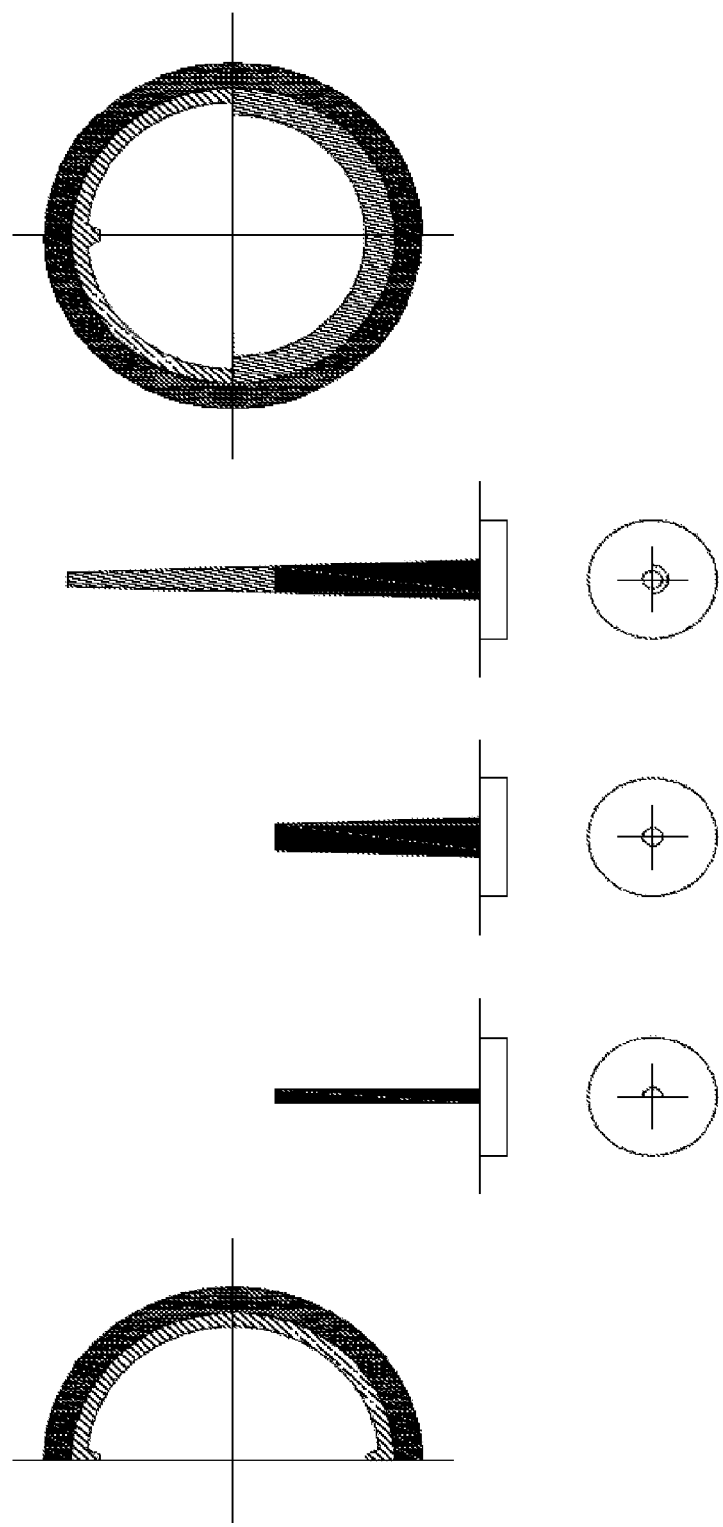
FIG. 22 shows an illustration relating to possible steps according to this invention for erecting the proposed support structure.

FIG. 22 shows an example of the methodology that can be implemented for erecting the support structure or tower according to the invention, showing how each of the wall pieces (2, 3) is installed separately, being attached, if that is the case, to an adjacent piece through a longitudinal joint (attachment of the vertical inter-piece contact edges or forming a transverse joint attaching one piece (2, 3) to the one immediately below it).

The implementation of the invention is compatible with performing local post-tensioning local in certain parts of the tower with greater requirements or with post-tensioning affecting only some of the wall pieces or a part thereof, in the understanding that most of the wall pieces will depend on the structural rigidity obtained in their manufacture in the manufacturing bed.

What is claimed is:

1. A support structure for a wind turbine, the support structure comprising
    a plurality of annular structural sections that are superimposed and attached to each other by transverse joints,
    wherein one of said plurality of annular structural sections is provided by a metal column shaft and one or more of remaining ones of said plurality of annular structural sections have a plurality of prefabricated concrete wall pieces arranged adjacent each other and are in attachment with each other by longitudinal joints,
    each of the plurality of prefabricated concrete wall pieces being in a prestressed condition by means of a plurality of stressed cables extending throughout,
    each of said prefabricated concrete wall pieces having a prestressed center and having a perimeter with a non-prestressed steel reinforcement; and
    said prefabricated concrete wall pieces of one or more of said annular structural sections having two end portions and having in one or two of said end portions a thickened section in which ducts are configured that arrange therethrough spans of prestressed cables, providing an attachment between said two end portions, each of said end portions having an end face so that one of the end faces from each of adjacent ones of said prefabricated concrete wall pieces of a neighboring two of the plurality of annular structural sections face each other;
    said ducts having an entrance located at a central part of one of said end faces of the wall pieces and having an outlet area at an end portion of the thickened section opposed to said one of said end faces; and
    the thickened section comprises a configuration starting from one of said end faces that thickens increasingly until ending at said outlet area of one of the ducts.

2. The support structure according to claim 1, wherein the outlet area has a surface to which is anchored a post-tensioned cable.

3. The support structure according to claim 1, wherein the thickened section encompasses a complete or fraction of one of the plurality of annular structural sections.

4. The support structure according to claim 1, wherein in some of said prefabricated concrete wall pieces the prestressed cables that precompress the prefabricated concrete wall pieces are extended through extension spans, projecting out of the prefabricated concrete wall pieces, said extension spans being inserted through said ducts and configured in an adjacent wall piece to link thereto through a subsequent tensioning of said cable extension spans so as to obtain a transverse joint that assures continuity of the prestressing as superimposed ones of the plurality of prefabricated concrete wall pieces are arranged with their ends facing each other.

5. The support structure according to claim 1, wherein the ducts have jacket tubes for the passage of the projecting cables for subsequent tensioning.

6. The support structure according to claim 1, wherein each of the plurality of annular structural sections comprise at least two wall pieces attached to each other by means of transverse and longitudinal joints and have a non-prestressed reinforcement in a perimeter of each of the plurality of annular structural sections.

7. The support structure according to claim 6, wherein the plurality of prefabricated concrete wall pieces each has a cross-section selected from a group consisting of polygonal and semicircular.

8. The support structure according to claim 7, wherein the prestressed condition of the at least two wall pieces deviates from center with respect to an associated thickness of the plurality of prefabricated concrete wall pieces.

9. The support structure according to claim 7, wherein the prestressed condition of the plurality of prefabricated concrete wall pieces has a non-uniform distribution throughout the plurality of annular structural sections that correct effects of their own weight or other temporary loads.

10. The support structure according to claim 6, wherein the longitudinal joints associated with different ones of the annular structural sections are displaced in a rotating direction.

11. The support structure according to claim 6, wherein an attachment of the transverse joints to the tower foundation and between the spans is by means of a collar-like thickening at ends of each of the plurality of prefabricated concrete wall pieces, perforated in a direction of a generatrix of associated ones of the plurality of prefabricated concrete wall pieces so as to allow joining by means of high-strength steel bars that are post-tensioned on site at a time of assembly and with sufficient length to assure continuity of the prestress in all the annular structural sections of the support structure, despite the loss of prestress in the anchoring areas of strands.

12. The support structure according to claim 1, wherein each of the plurality of prefabricated concrete wall pieces have a shape selected from a group consisting of frustoconical and cylindrical, the plurality of prefabricated concrete wall pieces of different ones of the plurality of annular structural sections being attached by transverse joints having different heights.

13. The support structure according to claim 12, wherein the prefabricated concrete wall pieces are placed atop of the support structure, the prefabricated concrete wall pieces being intercalated with each having a different height, the transverse joints between the prefabricated concrete wall pieces of successive spans or column shafts at different levels allowing assembly of the support structure without auxiliary assembly structures or elements.

14. The support structure according to claim 1, further comprising at least one of the stressed cables being arranged through projecting portions, with greater thickness, at ends of each of the plurality of prefabricated concrete wall pieces.

15. The support structure according to claim 1, wherein the plurality of prefabricated concrete wall pieces are each of a material selected from the group consisting of high-strength concrete, selfcompacting concrete and fiber concrete.

* * * * *

UNITED STATES PATENT AND TRADEMARK OFFICE
CERTIFICATE OF CORRECTION

| | | |
|---|---|---|
| PATENT NO. | : 9,163,613 B2 | Page 1 of 1 |
| APPLICATION NO. | : 14/329871 | |
| DATED | : October 20, 2015 | |
| INVENTOR(S) | : Francisco Javier Martinez de Castaneda and Manuel Cidoncha Escobar | |

It is certified that error appears in the above-identified patent and that said Letters Patent is hereby corrected as shown below:

Title Page

(73) Assignee should read: PACADAR S.A. (ES)

Signed and Sealed this
First Day of December, 2015

Michelle K. Lee
*Director of the United States Patent and Trademark Office*